United States Patent [19]
Satou

[11] Patent Number: 5,732,305
[45] Date of Patent: Mar. 24, 1998

[54] CAMERA HAVING CENTRALIZED ELECTRICAL CONNECTION AREA

[75] Inventor: Kouji Satou, Miyagi, Japan

[73] Assignees: Nikon Corporation, Tokyo; Sendai Nikon Corporation, Natori, both of Japan

[21] Appl. No.: 827,712

[22] Filed: Apr. 8, 1997

Related U.S. Application Data

[63] Continuation of Ser. No. 524,181, Sep. 6, 1995, abandoned.

[30] Foreign Application Priority Data

Oct. 31, 1994 [JP] Japan ................................ 6-266827

[51] Int. Cl.⁶ .................................................. G03B 17/02
[52] U.S. Cl. ............................................. 396/541; 396/542
[58] Field of Search ................................ 396/535, 541, 396/542; 354/485

[56] References Cited

U.S. PATENT DOCUMENTS 3,999,194  12/1976  Imura et al. ............................ 354/485

FOREIGN PATENT DOCUMENTS 63-237045  10/1988  Japan .
1-254931   10/1989  Japan ................................ 354/485
6-82891     3/1994  Japan ................................ 354/485

*Primary Examiner*—Russell E. Adams

[57] ABSTRACT

A camera including a body unit and a top cover unit configured to be mounted on the body unit. The body unit has a body section that defines a space within the camera. The camera also includes a component disposed on the top cover unit and a control unit disposed in the space defined within the camera. The control unit controls the component. The camera also includes a connection unit that electrically connects the component and the control unit. The connection unit is disposed proximately close to the space defined within the camera, thereby allowing the top cover unit to be removed from the body unit without disconnecting the component and the control unit and thereby allowing diagnostic operations to be performed within the camera.

12 Claims, 4 Drawing Sheets

CAMERA HAVING CENTRALIZED ELECTRICAL CONNECTION AREA

This application is a continuation of application Ser. No. 08/524,181, filed Sep. 6, 1995, now abandoned.

BACKGROUND OF THE INVENTION

1. Field of the Invention

The present invention relates to a camera having a centralized electrical connection area.

2. Description of the Related Art

It is well known that cameras include a multitude of electrical circuits to control various function units such as display units, setting units, flash lighting units, etc. As such, because of the volume of electrical circuits within a typical camera, such circuits need be mounted and connected to other structures within the camera in very complicated ways. Accordingly, as the mounting sites within the typical camera are limited, one can mount such electrical circuits either in a camera body unit or in a top cover unit of the camera.

For example, in some cameras, data display units are often packed together with other electrical circuits in a camera's top cover unit. As such, the various control circuits for such data display units cannot be mounted proximately close to the display unit because of physical space limitations and the like.

Moreover, in the typical body unit of a typical camera, a power supply unit, and a main circuit for effectuating photographic operations, are often mounted in a camera body such that they fill the space within the body. As such, there is little space to spare in the typical camera body, thereby rendering it impossible to maintain mounting and connection space for other control circuits such as for control of a display member, for example. As such, camera manufacturers have been forced to provide cameras wherein a component such as a display unit is mounted in a camera's top cover unit and wherein the control circuitry for such a display unit is mounted in a camera body unit and wherein elaborate wiring systems are devised.

Where components are mounted in a top cover unit of a camera and the electrical control circuits therefore are mounted in a camera body unit, it often becomes necessary to provide electrical connection systems that can withstand the stresses of opening and closing of the top cover unit in relation to the camera body unit.

Referring now to FIGS. 3 and 4, prior art cameras typically incorporate connection systems using either lead wires as shown in FIG. 3 or a pressure connection incorporating a flexible printed circuit board as shown in FIG. 4. More particularly, FIG. 3 illustrates the electrical connection of components within a body unit 2 and a top cover unit 3 in a camera 1 wherein lead wires 4A, 4B are used. Lead wire 4A is used for the connection of the built-in flash lighting control circuit (not shown) and a light generating unit 6 of a flash light built into the top cover unit 3. Furthermore, lead wire 4B is typically used for connecting a power supply and signal lines, etc., located in the top cover unit 3 and which may be used with an externally mounted flash light, for example.

In a typical camera as depicted in FIG. 3 or FIG. 4, for example, a film loading unit 9 is disposed on the opposite side of grip portion 7 of body unit 2 of camera 1. As wiring for various function units in a camera of the type depicted in FIG. 3 is well known, a specific description of the same is omitted.

The prior art lead wire connection approach illustrated by FIGS. 3 and 4 realizes significant damage to the lead wires when the top of a camera is mounted to the body of the camera (i.e., wires are often crushed and inappropriately placed inside the camera body). Accordingly, to alleviate this problem, flexible printed circuit boards like flexible printed circuit board 5 have been used with pressure connection solutions as illustrated in FIG. 4.

Moreover, cameras of FIGS. 3 and 4 are such that if top cover 3 is removed from body unit 2, the electrical connections between components in the top cover 3 (e.g., a display device) and components in the body unit 2 (e.g., a display device control unit) must be disconnected. That is, the cameras of FIGS. 3 and 4 show connection systems wherein if the top cover unit 3 is removed from body unit 2, it either becomes very difficult to access the internals of the camera body unit 2 for such purposes as diagnostics or the like or the illustrated electrical connections such as lead wires 4A and 4B must be disconnected. More particularly, FIG. 4 shows a situation wherein removal of top cover unit 3 causes a display unit (not shown) which is mounted on the top cover unit 3 to be disconnected from its control circuitry.

The cameras depicted in FIGS. 3 and 4 have a battery compartment 8 for battery loading that is located on the grip portion side 7 of the body unit 2. Additionally, a DC-DC converter and power supply circuit (not shown) are typically located in the periphery of battery compartment 8.

Furthermore, in the top cover unit 3, various kinds of display members and the like (not shown) for data display also are often located in the grip portion side 7 of the body unit 2. As such, the connection space of the top cover unit 3 and body unit 2 can not be maintained in the grip portion side 7 due to physical space limitations within the camera body unit.

In the prior art camera 1 shown in FIG. 4, the electrical connection of the top cover unit 3 and the body unit 2 is carried out by a flexible multi-channel communication device such as by pressure connection of a flexible printed circuit board or lead wires 5. As such, the connection of electrical components is centralized on the film loading unit side 9 of the camera which causes the disconnection problems mentioned above.

The following problems developed with regard to the typical connection solutions illustrated in FIGS. 3 and 4. First, in camera 1 a built-in speed or flash light is provided. As such, the flash light generation unit 6 is built into the top cover and the control board for the same is located in the body unit 2. The control board is located close to the battery of the battery compartment 8 and the necessary electrical connections are achieved by lead wire 4A. As such, lead wire 4A can be damaged due to being squeezed when the top cover 3 is mounted on body unit 2.

Moreover, in order to perform circuit analysis and the like when detaching the top cover unit 3 from the body unit 2, the top cover unit 3 could not be completely detached as a result of the connection of lead wires 4A and 4B. As such, it became inconvenient to perform circuit analysis operations.

In other words, in the case of using a pressure connection as the electrical connection of the top cover unit 3 and body unit 2 of a camera 1, when adopting electrical connection on the film loading unit side 9 for reasons of mounting space, in the case of a camera 1 with a built-in type speed light, in order to connect the built-in flash light on the grip portion side 7, the connection portions to the top cover 3 became located on both sides of the pentaprism. Accordingly, the assembly process of camera 1 become quite difficult and complicated. Additionally, the analysis operations at a time of circuit analysis were also difficult to perform.

SUMMARY OF THE INVENTION

Accordingly, a primary object of the present invention is to solve the aforementioned problems of conventional electrical connection systems used in cameras.

It is another object of the present invention to provide a camera that has a centralized electrical connection area that is disposed in a space defined by a camera body.

It is still another object of the present invention to provide a camera that has a centralized electrical connection area that permits a camera to be disassembled without disconnecting the electrical connections among electrical components of the camera.

It is yet a further object of the present invention to provide a camera that has a centralized electrical connection area that permits a flash lighting device to remain electrically connected to its control circuitry when the camera is disassembled, thereby permitting diagnostic operations to be carried out effectively and efficiently.

It is still a further object of the present invention to provide a camera that permits diagnostic operations to be carried out on components of the camera efficiently and easily.

Objects of the present invention are achieved by providing a camera including a body unit and a top cover unit configured to be mounted on the body unit. The body unit has a body section that defines a space within the camera body. The camera also includes a component disposed on the top cover unit and a control unit disposed in the space defined within the camera body. The control unit controls the component. The camera also includes a connection unit that electrically connects the component and the control unit. The connection unit is disposed proximately close to the space defined within the camera body, thereby allowing the top cover unit to be removed from the body unit without disconnecting the component and the control unit.

Finally, objects of the present invention are further achieved by providing a camera that includes a body unit and a top cover unit configured to be mounted on the body unit. The body unit has a body section that defines a space within the camera body. Also, the camera includes a flash lighting device mounted on the top cover unit, a display unit mounted on the top cover unit, a flash control unit disposed in the space defined within the camera body which controls the flash lighting device and a display control unit disposed in the space defined within the camera body which controls the display unit. Additionally, the camera includes a connection unit respectively connecting the flash lighting device, the flash control unit, the display unit and the display control unit. The connection unit being disposed proximately close to the space defined within the camera body, thereby allowing the top cover unit to be removed from the body unit without disconnecting the flash lighting device and the flash control unit and without disconnecting the display unit and the display control unit.

BRIEF DESCRIPTION OF THE DRAWINGS

The aforementioned and other objects and advantages of the present invention will become apparent and more readily appreciated from the following description of the preferred embodiment, taken in conjunction with the accompanying drawings, of which.

DETAILED DESCRIPTION OF THE PREFERRED EMBODIMENT

Figure 1:
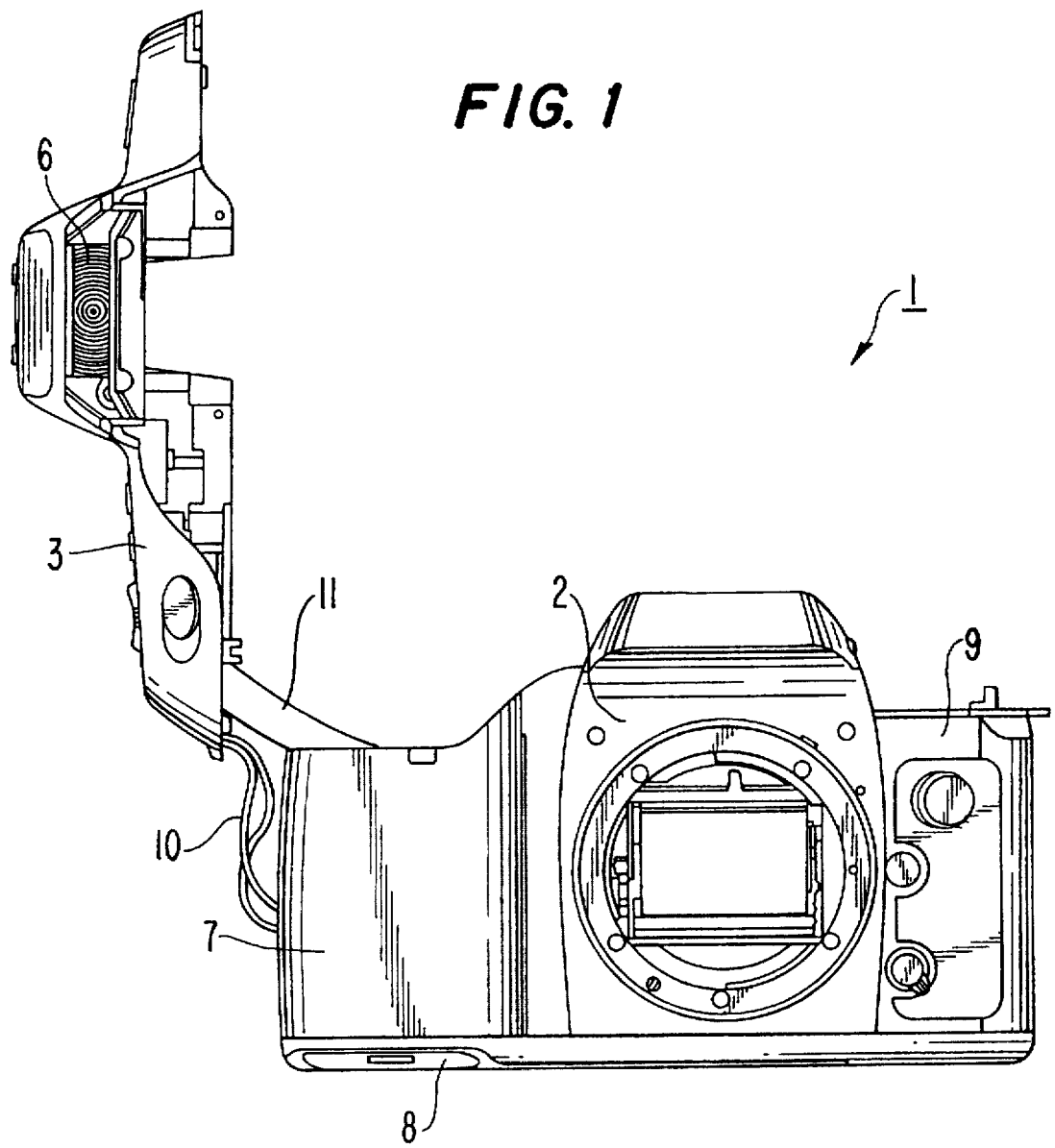
FIG. 1 is a diagram that shows a connection state of a top cover unit and body unit of a camera according to a preferred embodiment of the present invention.

Reference will now be made in detail to the present preferred embodiment of the present invention, examples of which are illustrated in the accompanying drawings, wherein like reference numerals refer to like elements throughout.

Figure 2:
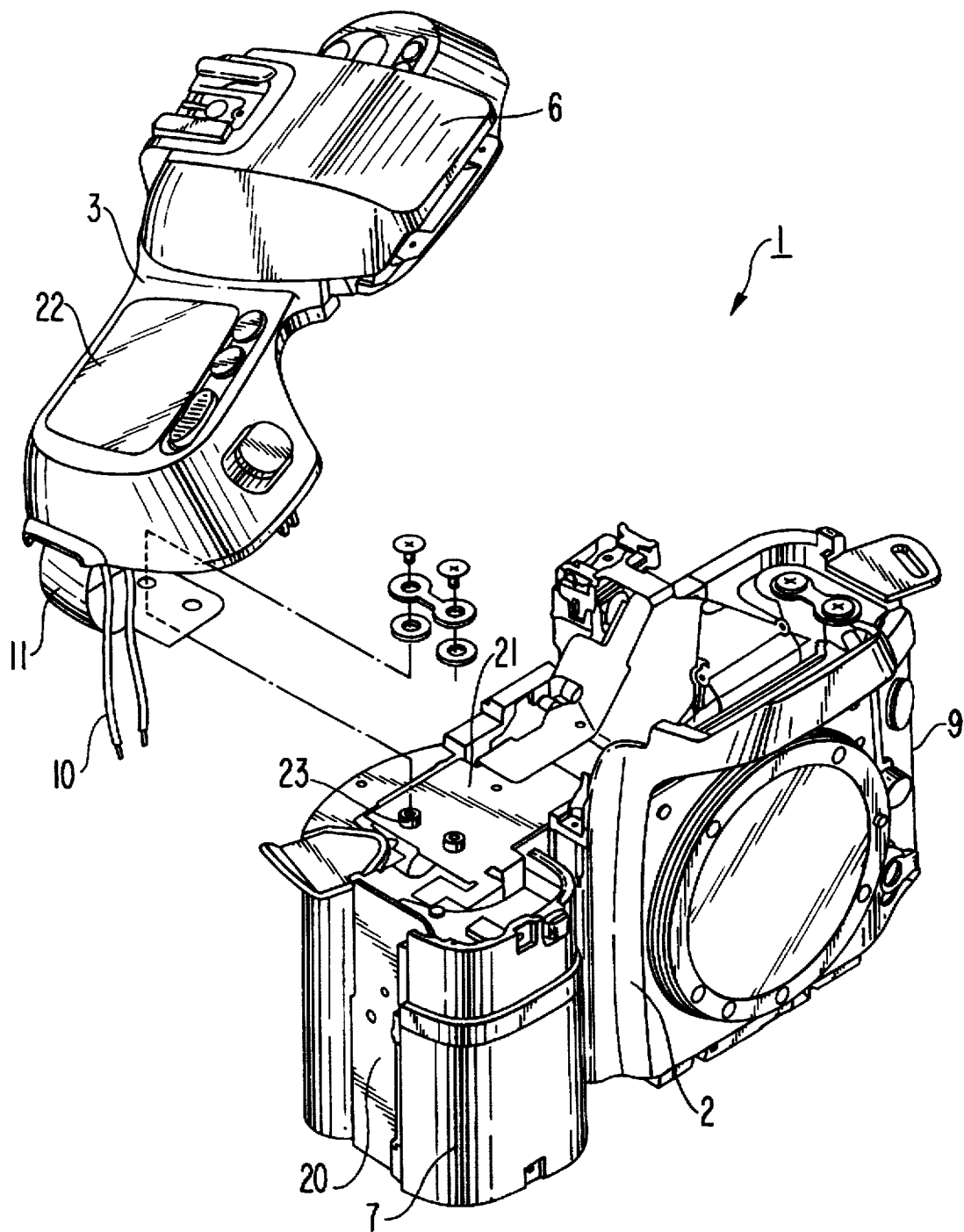
FIG. 2 is an oblique diagram of the camera illustrated in FIG. 1.
Figure 3:
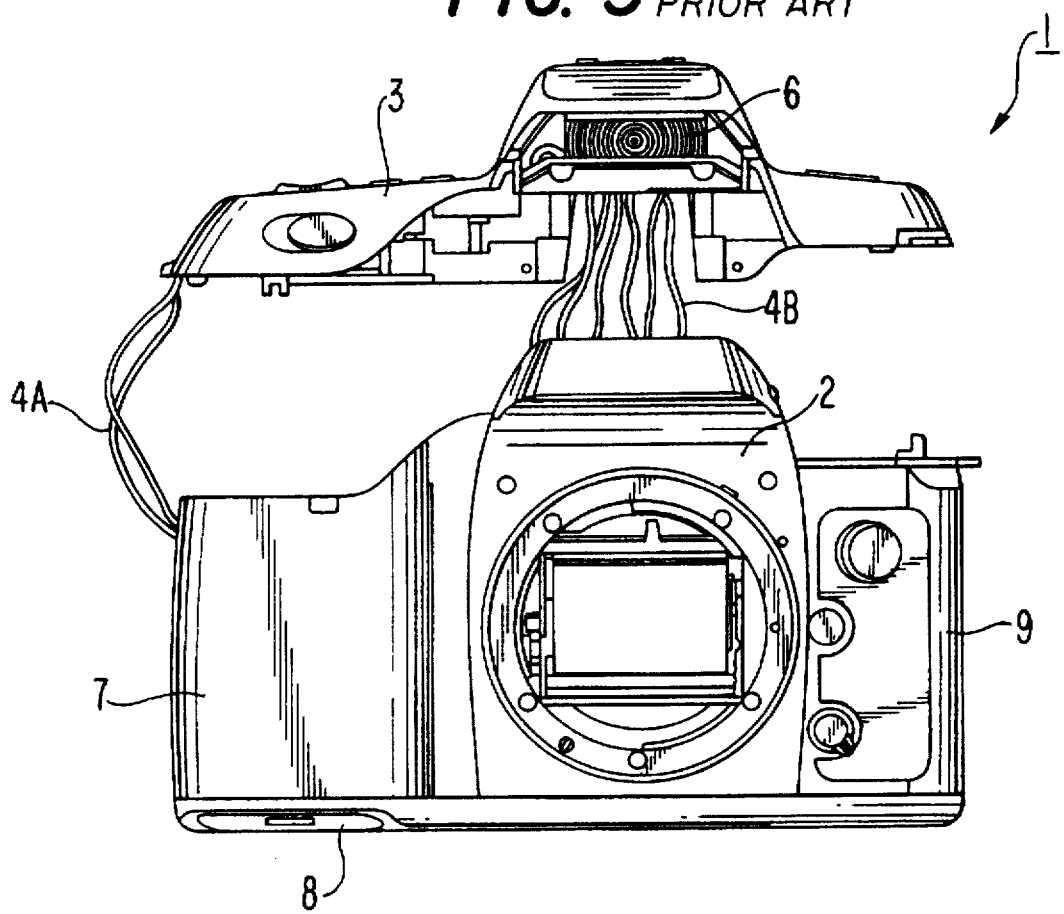
FIG. 3 is a diagram that shows a connection state of a top cover unit and body unit of a camera according to the prior art.
Figure 4:
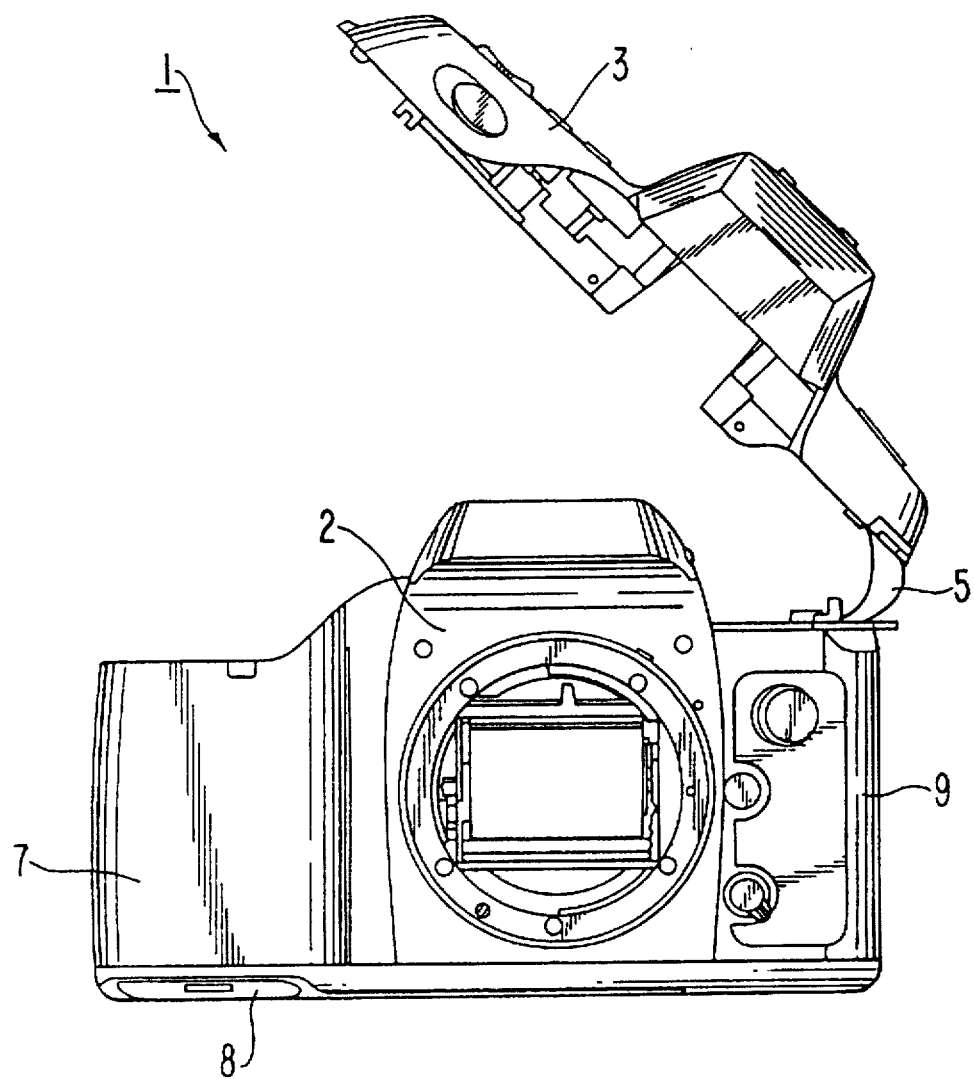
FIG. 4 is a diagram that shows another connection state of a top cover unit and body unit of a camera according to the prior art.

Referring now to FIGS. 1 and 2, therein shown is a camera according to a preferred embodiment of the present invention. In FIGS. 1 and 2, the elements corresponding to the structural elements shown in FIGS. 3 and 4 are referred to with like reference numerals.

Camera 1 is equipped with a built-in light generation unit 6, and a display member 22 comprising liquid crystal display elements for data display use. Camera 1's main control circuit 21 is disposed in body unit 2. A control circuit unit 20 for the built-in light generation unit 6 also is disposed in body unit 2.

Main control circuit 21 and control circuit unit 20 are located near top cover unit 3 and display member 22. Moreover, main control circuit 21 and control circuit unit 20 are connected by an electrical connection unit 11 (e.g., in the form of pressure connection of a flexible printed board) via a pressure connection unit 23. Additionally, control circuit unit 20 and light generation unit 6 receive power via electrical connection unit 10 (e.g., in the form of a lead wire). The two electrical connection units 10 and 11 are packed together in a grip portion side 7 of body unit 2.

By packing the two electrical connection units 10 and 11 into the grip portion side 7, as opposed to in or near the film loading unit 9, the mounting operation of the top cover unit 3 to the body unit 2 can be easily and safely performed. Additionally, analysis operations can be performed without removing any of the above mentioned connections when performing circuit analysis of the main control circuit 21 and the like. More particularly, the pressure connection of the body unit 2 and the top cover unit 3 and the fact that the electrical circuit connections via flexible printed board 11 and lead wire 10 are located in the same side of camera 1 (i.e., in the grip portion side 7), now makes it possible to perform easy and safe assembly. Moreover, top cover 3 can be completely opened without removing or dismantling any of the electrical connections.

It should be noted that main control circuit 21, as shown in FIG. 2, includes a 4-layer flexible printed board. Moreover, the control of the operating segments of camera 1 such as the photometric unit, the rangefinding unit, the light regulation unit, the display unit, and the like is done via the connection units 10 and 11 which are disposed on a single side of camera 1 (i.e., on the grip portion side 7).

Moreover, the display device 22 and the like in the top cover 3 may be connected via a bridge in the form of a single or double sided flexible printed board 11. A solder bridge has been used, but other connection systems including clips and sockets may be used.

Moreover, it should be noted that lead wire 10, as shown in FIG. 1, has a length that permits top cover 3 to be mounted and detached in relation to body unit 2. Furthermore, the length of the pressure connection terminal side of flexible printed board 11 is also set so that it tolerates a sufficient opening and closing angle during a connection or re-assembly operation.

Moreover, embodiments of the present invention are not limited to the structure of the above described presently preferred embodiment. It goes without saying that the configuration of each portion of camera 1 may be suitably modified and changed.

In view of the foregoing disclosure, it now will be readily appreciated that electrical connections within a camera may be located in a grip portion side of the camera.

In particular, the electrical connection of a light generation unit of a built-in type flash light and the control circuit unit for same may be connected regardless of an open or closed state of a camera's top cover unit and body unit. As such, the present invention allows for easy and safe camera assembly and diagnostic evaluation.

Finally, although preferred embodiments of the present invention have been shown and described, it will be appreciated by those skilled in the art that many changes may be made to such embodiments without departing from the principles and spirit of the invention, the scope of which is defined in the appended claims and equivalents thereof.

What is claimed is:

1. A camera comprising:
   a body unit and a top cover unit configured to be mounted on the body unit, the body unit having a film cannister load section and a grip section disposed at a side of said camera opposite said film cannister load section;
   a component disposed on the top cover unit;
   a control unit disposed in the body unit proximate the grip section, the control unit controlling the component; and
   a connection unit connecting the component and the control unit, the connection unit being disposed so as to connect at said grip section thereby allowing the top cover unit to be removed from the body unit without disconnecting the component and the control unit and thereby allowing diagnostic operations to be performed within the camera.

2. The camera of claim 1, wherein the component is a data display unit displaying camera operation information.

3. The camera of claim 1, wherein the control unit is a control circuit controlling the component.

4. The camera of claim 1, wherein a battery is storable in the body unit.

5. The camera of claim 1, wherein the connection unit includes a lead wire and a flexible multi-channel communication device.

6. The camera of claim 5, wherein the flexible multi-channel communication device is a flexible printed circuit board.

7. The camera of claim 1, wherein the component is a flash lighting unit and the control unit is a flash light control circuit controlling the flash lighting unit.

8. A camera comprising:
   a body unit and a top cover unit configured to be mounted on the body unit, the body unit having a film canister load section and a grip section disposed at a side of said camera opposite said film canister load section;
   a flash lighting device mounted on the top cover unit;
   a display unit mounted on the top cover unit;
   a flash control unit disposed in the body unit proximate the grip section, the flash control unit controlling the flash lighting device;
   a display control unit disposed in the body unit proximate the grip section, the display control unit controlling the display unit; and
   a connection unit respectively connecting the flash lighting device, the flash control unit, the display unit and the display control unit, the connection unit being disposed so as to connect only at said grip section thereby allowing the top cover unit to be removed from the body unit without disconnecting the flash lighting device and the flash control unit and without disconnecting the display unit and the display control unit and thereby allowing diagnostic operations to be performed within the camera.

9. The camera of claim 8, wherein the connection unit includes a flexible printed circuit board and a lead wire arrangement.

10. A camera electrical connection, comprising:
    a first connection unit disposed within a camera body at a grip section thereof, the grip section being formed at a lateral side of said camera body opposite a film canister housing section of said camera body; and
    a second connection unit disposed within a top unit that connects to said camera body, with the second connection unit being disposed at a grip section side of said top unit, said second connection unit being joinable to said first connection unit,
    wherein said camera electrical connection allows for said camera to be opened and closed without disconnecting components in said top unit from control devices in said camera body so as to allow for performance of diagnosis operations within the camera.

11. The camera electrical connection of claim 10, wherein said first connection unit is at least one flexible circuit board.

12. The camera electrical connection of claim 10, wherein said second connection unit is a flexible circuit board and a pair of wires.

* * * * *